US012352955B2

(12) United States Patent
Mizuochi et al.

(10) Patent No.: US 12,352,955 B2
(45) Date of Patent: Jul. 8, 2025

(54) HEAD-UP DISPLAY DEVICE

(71) Applicant: NIPPON SEIKI CO., LTD., Niigata (JP)

(72) Inventors: Masahiko Mizuochi, Niigata (JP); Shinji Oguchi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 435 days.

(21) Appl. No.: 17/795,179

(22) PCT Filed: Feb. 4, 2021

(86) PCT No.: PCT/JP2021/004016
§ 371 (c)(1),
(2) Date: Jul. 25, 2022

(87) PCT Pub. No.: WO2021/157633
PCT Pub. Date: Aug. 12, 2021

(65) Prior Publication Data
US 2023/0063573 A1 Mar. 2, 2023

(30) Foreign Application Priority Data

Feb. 5, 2020 (JP) .................................. 2020-018171
Dec. 21, 2020 (JP) .................................. 2020-211388

(51) Int. Cl.
G02B 27/01 (2006.01)
B60R 1/12 (2006.01)
(52) U.S. Cl.
CPC ............ G02B 27/0101 (2013.01); B60R 1/12 (2013.01); B60R 2300/205 (2013.01); G02B 2027/0169 (2013.01)

(58) Field of Classification Search
CPC ... G02B 27/01–0189; G02B 2027/0105–0198; G03B 21/00–64
See application file for complete search history.

(56) References Cited

U.S. PATENT DOCUMENTS

2013/0128234 A1* 5/2013 Fujioka ................ G03B 21/008
353/52
2014/0268359 A1 9/2014 Yuki et al.
(Continued)

FOREIGN PATENT DOCUMENTS

JP 2014-174416 A 9/2014
JP 2016-20945 A 2/2016
(Continued)

OTHER PUBLICATIONS

International Search Report issued in corresponding International Application No. PCT/JP2021/004016, dated Apr. 6, 2021, w/ English Translation (5 pages).

Primary Examiner — Christopher A Lamb, II
(74) Attorney, Agent, or Firm — Rimon P.C.

(57) ABSTRACT

A head-up display device is provided which can suppress error in the attachment position of a fixed mirror. This head-up display device is provided with a display which emits display light, a first mirror which reflects display light from the display, a second mirror which is provided rotatably about a rotation axis and which reflects towards a window shield the display light reflected by the first mirror, a mirror support unit which supports the first mirror, a holding case unit which holds the second mirror and which is formed integrally with the mirror support unit, and plate springs which fix the first mirror to the mirror support unit by pressing the first mirror towards the mirror support unit.

4 Claims, 10 Drawing Sheets

(56) References Cited

U.S. PATENT DOCUMENTS

2015/0131160 A1    5/2015  Kwak
2021/0181504 A1*   6/2021  Sugiyama .......... G02B 27/0101

FOREIGN PATENT DOCUMENTS

| JP | 6505281 B | 4/2019 | |
| JP | 2019078966 A | 5/2019 | |
| WO | 2018062302 A1 | 4/2018 | |
| WO | WO-2019082920 A1 * | 5/2019 | ............. B60K 35/00 |

* cited by examiner

HEAD-UP DISPLAY DEVICE

CROSS REFERENCE TO RELATED APPLICATIONS

This application is the U.S. National Phase under 35 U.S.C. § 371 of International Application No. PCT/JP2021/004016, filed on Feb. 4, 2021, which claims the benefit of Japanese Application No. 2020-018171, filed on Feb. 5, 2020 and Japanese Application No. 2020-211388, filed Dec. 21, 2020, the entire contents of each are hereby incorporated by reference.

TECHNICAL FIELD

The present disclosure relates to a head-up display device.

BACKGROUND ART

For example, a head-up display device described in Patent Document 1 includes an image light emitting unit that emits image light, a plane mirror that reflects the image light from the image light emitting unit, and a concave mirror that is provided pivotably and reflects, toward a windshield, the image light reflected from the plane mirror. As illustrated in FIG. 2 of Patent Document 1, the plane mirror is held by a holder, and the holder is installed on an internal member of a housing. The internal member of the housing is installed in a lower member of the housing.

PRIOR ART DOCUMENT

Patent Document

Patent Document 1: Japanese Unexamined Patent Application Publication No. 2014-174416

SUMMARY OF THE INVENTION

Problems to be Solved by the Invention

In the configuration of Patent Document 1 mentioned above, the plane mirror is fixed to the lower member of the housing via the holder and the internal member of the housing. Thus, a plurality of members are interposed between the plane mirror and the lower member of the housing. Therefore, an error easily occurs in the attachment position of the plane mirror with respect to the lower member of the housing.

The present disclosure has been made in view of the above circumstances, and an object of the present disclosure is to provide a head-up display device capable of suppressing an error in the attachment position of a fixed mirror.

Solution to Problem

In order to achieve the above-described object, a head-up display device according to the present disclosure includes a display that emits display light, a fixed mirror that reflects the display light from the display, a rotating mirror that is provided rotatably about a rotation axis and reflects, toward a projection-receiving member, the display light reflected by the fixed mirror, a mirror support unit that supports the fixed mirror, a holding case unit that holds the rotating mirror and is formed integrally with the mirror support unit, and a spring that fixes the fixed mirror to the mirror support unit by pressing the fixed mirror toward the mirror support unit.

Effect of the Invention

According to the present disclosure, it is possible to suppress an error in an attachment position of a fixed mirror in a head-up display device.

MODE FOR CARRYING OUT THE INVENTION

An embodiment of a head-up display device according to the present disclosure will be described with reference to the drawings.

Figure 1:
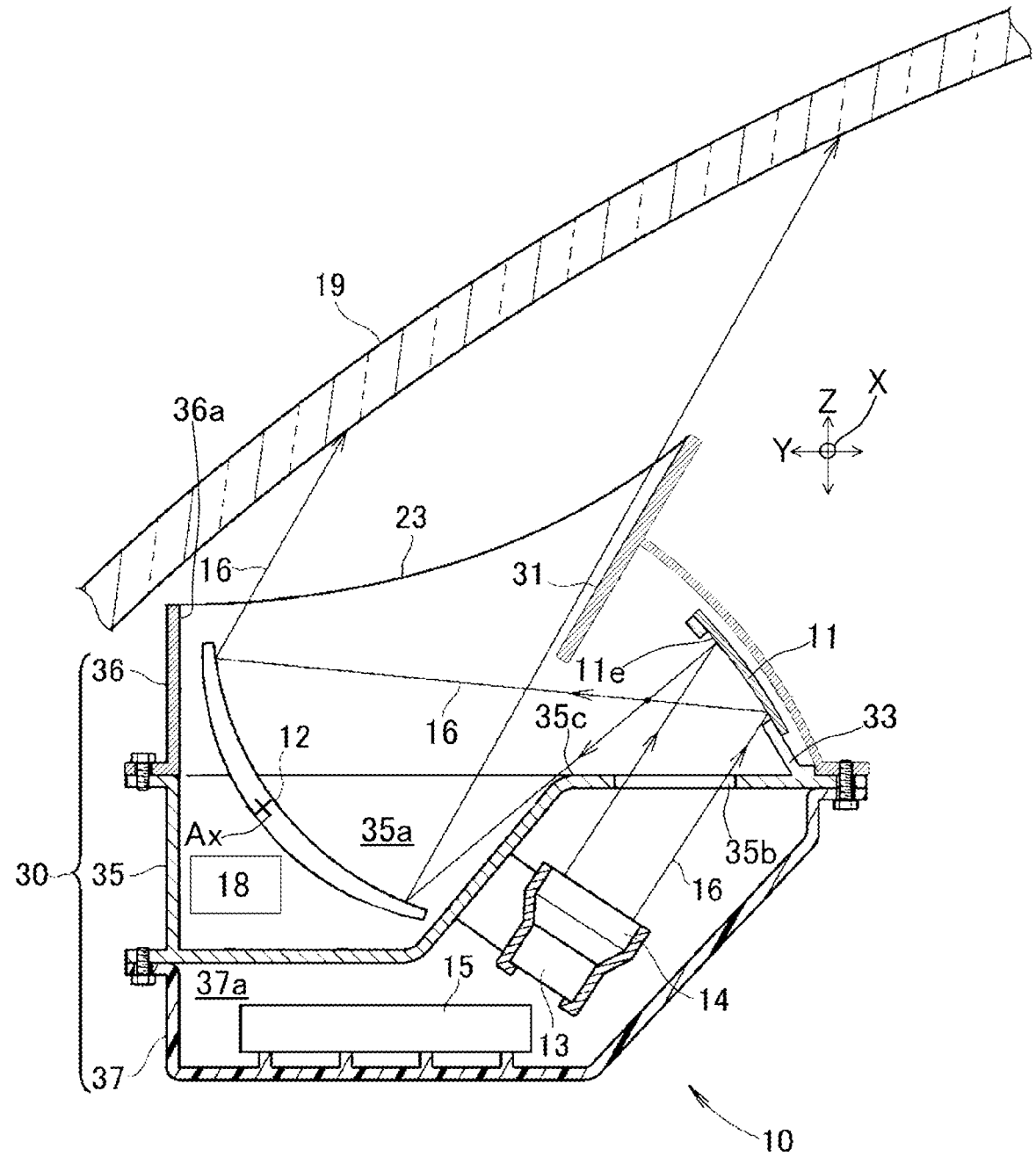
FIG. 1 is a schematic cross-sectional view of a head-up display device according to an embodiment of the present disclosure.

As illustrated in FIG. 1, a head-up display device 10 is mounted in a vehicle and projects display light 16 onto a windshield 19 to display a virtual image including vehicle information. In the following description, a height direction of the vehicle is defined as the Z direction, a width direction of the vehicle is defined as the X direction, and a front-rear direction of the vehicle is defined as the Y direction.

Figure 2:
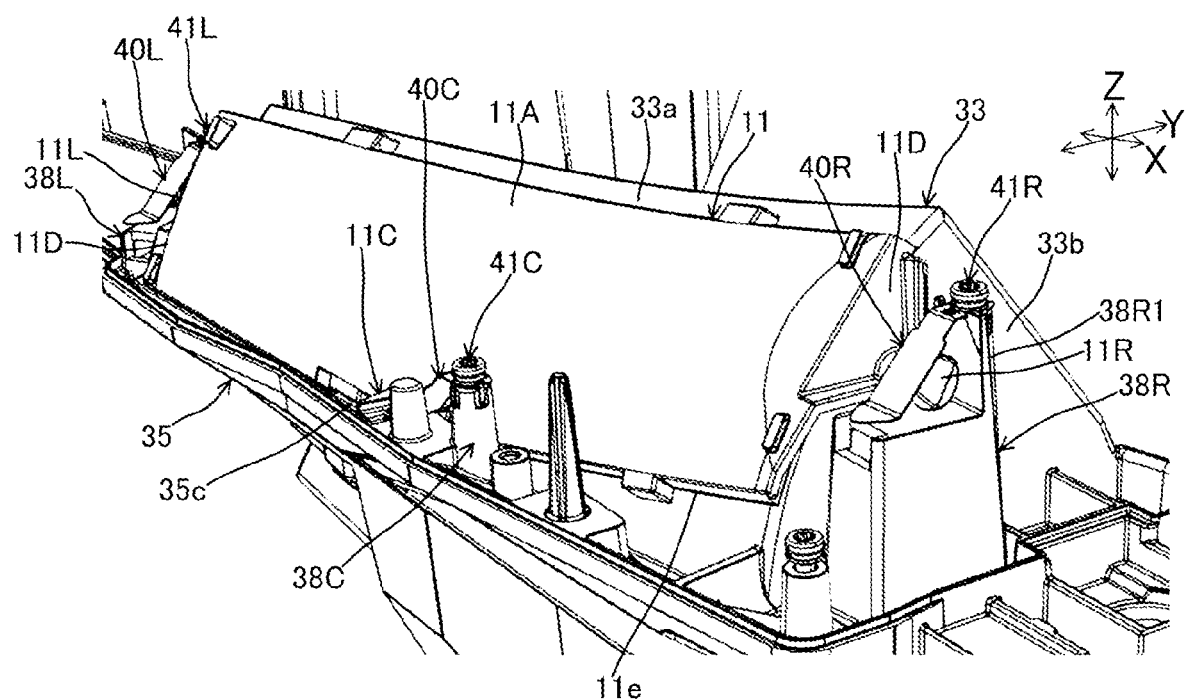
FIG. 2 is a perspective view of the head-up display device according to an embodiment of the present disclosure in a state where an upper cover is removed.
Figure 3:
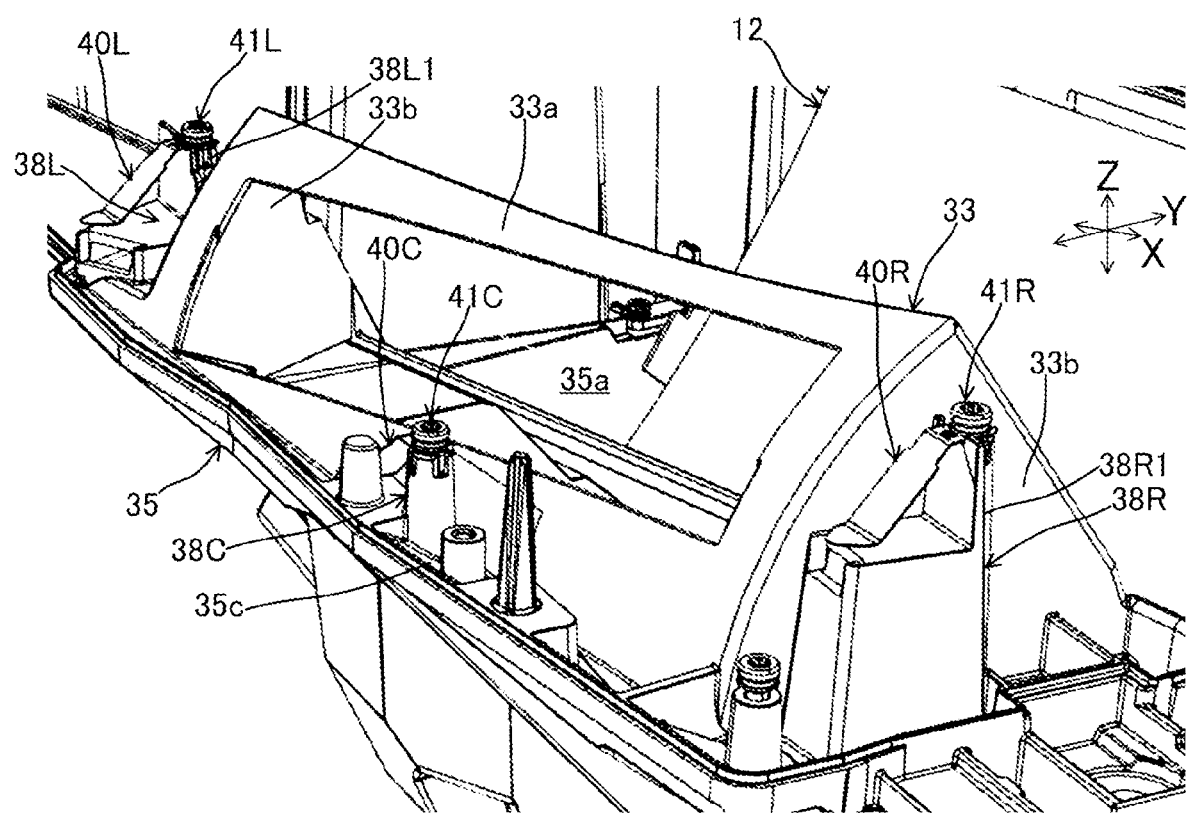
FIG. 3 is a perspective view of the head-up display device according to an embodiment of the present disclosure in a state where the upper cover and a first mirror are removed.

The head-up display device 10 includes, as illustrated in FIG. 1, a first mirror 11, which is an example of a fixed mirror, a second mirror 12, which is an example of a rotating mirror, a case 30, a light source 13, a display 14, a control board 15, and a mirror rotation drive unit 18, and as illustrated in FIGS. 2 and 3, plate springs 40L, 40R, and 40C and screws 41L, 41R, and 41C.

As illustrated in FIG. 1, the light source 13 emits illumination light toward the display 14 under the control of the control board 15. The light source 13 includes, for example, a plurality of light emitting diodes (LEDs). The display 14 receives the illumination light from the light source 13 and emits the display light 16 representing an image. The display 14 is, for example, a thin film transistor (TFT) type liquid crystal display panel.

The control board 15 controls the light source 13, the display 14, and the mirror rotation drive unit 18. The control board 15 includes a central processing unit (CPU), a graphic display controller (GDC), a read only memory (ROM), a random access memory (RAM), and the like. The control board 15 receives vehicle information from the outside, and emits illumination light from the light source 13 toward the display 14 while causing the display 14 to display an image including the vehicle information.

As illustrated in FIG. 1, the first mirror 11 reflects the display light 16 from the display 14 toward the second mirror 12. The first mirror 11 is a concave mirror, for example. If the first mirror 11 is a concave mirror, the display quality of the virtual image is more influenced by an error in an attachment position of the first mirror 11 in the case 30 than in a case where the first mirror 11 is a plane mirror. Therefore, in particular, if the first mirror 11 is a concave mirror, the first mirror 11 needs to be mounted in the case 30 with higher accuracy.

A specific configuration of the first mirror 11 will be described later.

The second mirror 12 is supported rotatably about a rotation axis Ax extending along the X direction, in a later-described holding case unit 35 of the case 30. The second mirror 12 reflects the display light 16 from the first mirror 11 toward the windshield 19, which is an example of a projection-receiving member. The second mirror 12 is a concave mirror, for example. The second mirror 12 has a larger size in the X direction and the Z direction than the first mirror 11. The windshield 19 reflects the display light 16 from the second mirror 12 toward a viewer, for example, a driver. Thus, a virtual image including vehicle information is displayed on the windshield 19 so as to be visible to the viewer.

The mirror rotation drive unit 18 rotates the second mirror 12 about the rotation axis Ax under the control of the control board 15. Rotation of the second mirror 12 about the rotation axis Ax makes it possible to adjust an irradiation position of the display light 16 with respect to the viewer in the Z direction.

As illustrated in FIG. 1, the case 30 includes the holding case unit 35, an upper cover 36, a lower cover 37, and a mirror support unit 33.

The holding case unit 35 and the mirror support unit 33 are integrally formed. This integrally formed configuration does not include a configuration in which a plurality of members are fixed by a fixing means such as a screw, but indicates a configuration in which members are formed as an inseparable integral body in a molding process using a mold. That is, the holding case unit 35 and the mirror support unit 33 are formed as an integral body without using a fixing means such as a screw.

The holding case unit 35 is formed of an opaque resin or metal, and supports the second mirror 12, the light source 13, the display 14, and the mirror rotation drive unit 18.

The holding case unit 35 includes a holding space 35a that is open to the top. The second mirror 12 and the mirror rotation drive unit 18 are held in the holding space 35a. The second mirror 12 is held rotatably about the rotation axis Ax in the holding space 35a.

The light source 13 and the display 14 are fixed to a lower surface of the holding case unit 35. An opening unit 35b through which the display light 16 travels from the display 14 toward the first mirror 11 passes, is formed on an inner bottom surface 35c of the holding case unit 35.

A specific configuration of the mirror support unit 33 will be described later.

As illustrated in FIG. 1, the lower cover 37 is formed of an opaque resin or metal, and is formed so as to cover the lower surface of the holding case unit 35. The lower cover 37 includes a holding space 37a that is open to the top. The control board 15, the light source 13, and the display 14 are positioned in the holding space 37a in a state where the lower cover 37 is attached to the holding case unit 35.

The upper cover 36 is formed of an opaque resin or metal, and is attached above the holding case unit 35 to close the holding space 35a of the holding case unit 35. The upper cover 36 is formed in a frame shape including an opening unit 36a through which the display light 16 traveling from the second mirror 12 toward the windshield 19 passes. The upper cover 36 includes a light transmissive plate unit 23 that closes the opening unit 36a so as for the display light 16 to be transmitted, and a shielding unit 31 that prevents external light such as sunlight from entering an optical path of the display light 16. The shielding unit 31 has a plate shape that is inclined downward toward the front (toward the left in FIG. 1). The mirror support unit 33 and the first mirror 11 are positioned between the shielding unit 31 and the inner bottom surface 35c of the holding case unit 35.

Figure 6:
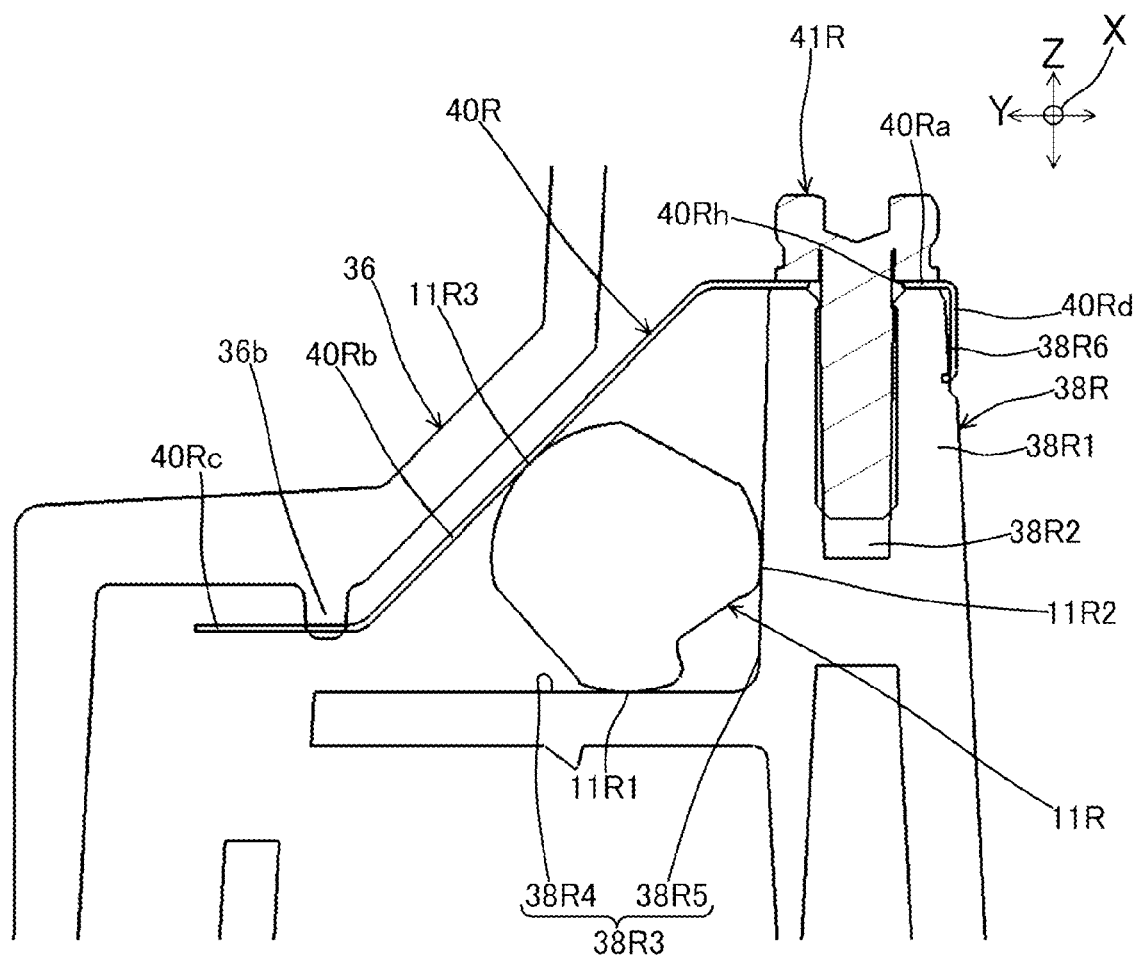
FIG. 6 is a cross-sectional view of the upper cover, a shaft unit, a shaft support unit, a plate spring, and the like according to an embodiment of the present disclosure.

As illustrated in FIG. 6, the upper cover 36 includes a pressing unit 36b that presses the plate spring 40R toward a shaft unit 11R. The pressing unit 36b has a columnar shape extending along the Z direction.

The upper cover 36 includes a pressing unit that, similarly to the pressing unit 36b, presses the plate spring 40L toward a shaft unit 11L.

Figure 7:
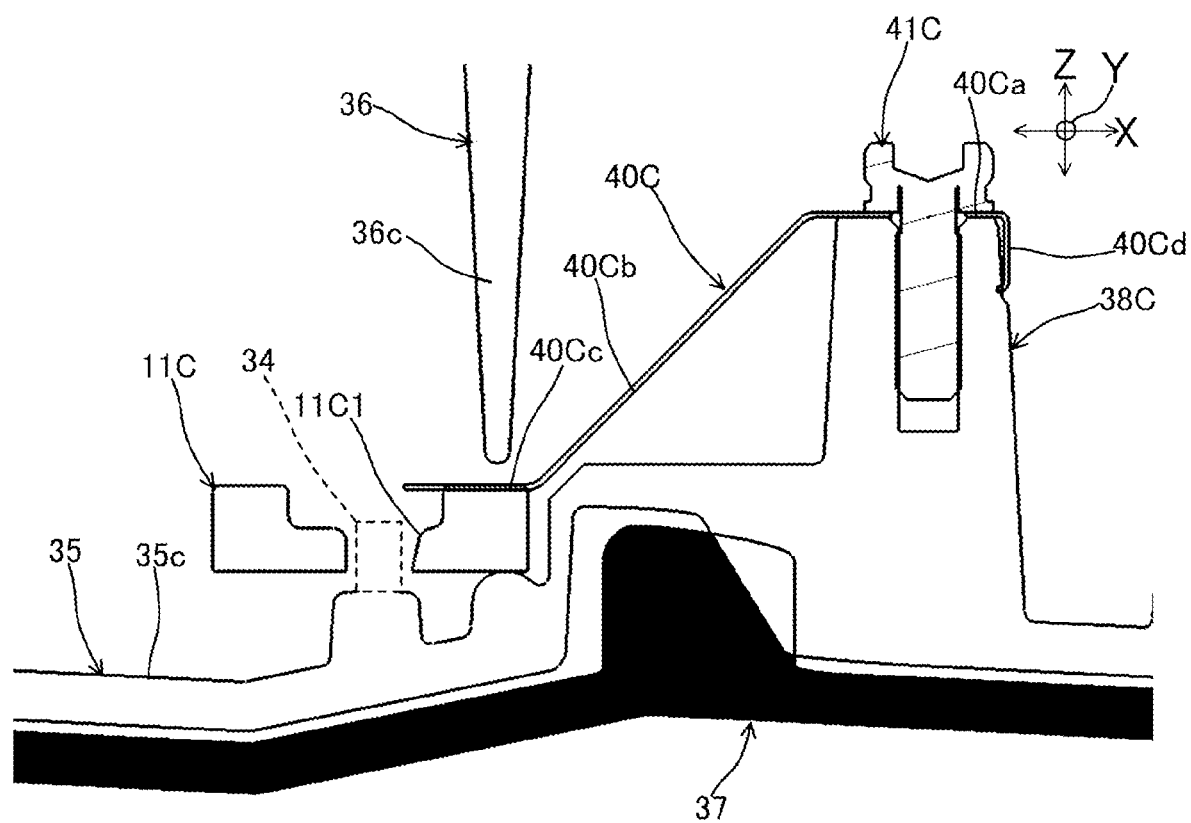
FIG. 7 is a cross-sectional view of the upper cover, a positioning unit, a spring fixing unit, the plate spring, and the like according to an embodiment of the present disclosure.

As illustrated in FIG. 7, the upper cover 36 includes an opposing unit 36c positioned upward from a later-described free end unit 40Cc of the plate spring 40C. The opposing unit 36c has a columnar shape elongated in the Z direction. A tip end forming a lower end of the opposing unit 36c restricts the deformation of the plate spring 40C by contacting the free end unit 40Cc.

Next, specific configurations of the first mirror 11, the mirror support unit 33, the holding case unit 35, and the plate springs 40L, 40R, and 40C will be described with reference to FIGS. 2 to 8.

As illustrated in FIG. 2, the first mirror 11 includes a main body unit 11A, the pair of shaft units 11L and 11R, a positioning unit 11C, and a pair of side wall units 11D. The main body unit 11A is curved along the Y direction and has a rectangular plate shape that is elongated in the X direction. The main body unit 11A includes a reflection surface 11e that reflects light and is positioned on a surface of the main body unit 11A facing the mirror support unit 33. The shaft units 11L and 11R, the positioning unit 11C, the side wall unit 11D, and the back surface side of the main body unit 11A are formed of a resin.

The pair of side wall units 11D extend in a direction orthogonal to the main body unit 11A at both ends of the main body unit 11A in the X direction. The pair of side wall units 11D each have a right angled triangular plate shape. The hypotenuses of the side wall units 11D are coupled to edge units of the main body unit 11A extending in the Z direction. The pair of side wall units 11D each extend to the front side to which the light reflected by the reflection surface 11e travels from the main body unit 11A.

As illustrated in FIGS. 2 and 3, the pair of shaft units 11L and 11R are provided at both ends of the first mirror 11 in the X direction and are supported by later-described shaft support units 38L and 38R of the mirror support unit 33. The shaft units 11L and 11R are respectively positioned at right-angled corner units of the side wall units 11D. The pair of shaft units 11L and 11R each have a substantially columnar shape extending outward along the X direction.

Figure 5:
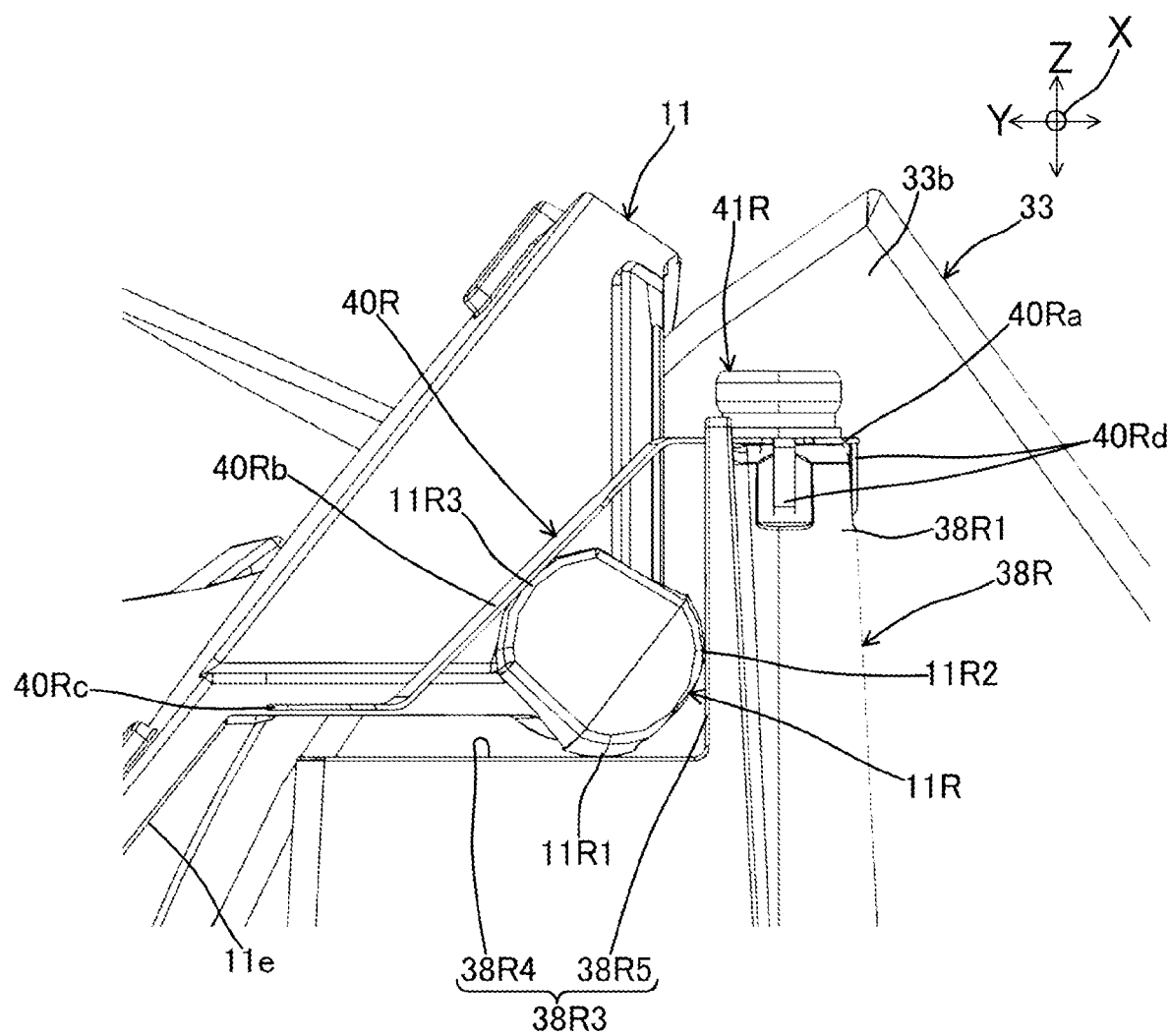
FIG. 5 is a side view of the head-up display device according to an embodiment of the present disclosure in the state where the upper cover is removed.

As illustrated in FIG. 5, the shaft unit 11R includes a first curved surface 11R1, a second curved surface 11R2, and a third curved surface 11R3.

The first curved surface 11R1 is a part of an outer peripheral surface of the shaft unit 11R and contacts a first surface 38R4 of a shaft support surface 38R3 described later. The second curved surface 11R2 is a part of the outer peripheral surface of the shaft unit 11R, is positioned next to the first curved surface 11R1, and contacts a second surface 38R5 of the shaft support surface 38R3 described later. The third curved surface 11R3 is a part of the outer peripheral surface of the shaft unit 11R and contacts a later-described shaft contact unit 40Rb of the plate spring 40R. The third curved surface 11R3 is positioned so as to face the first curved surface 11R1 and the second curved surface 11R2 in a radial direction of the shaft unit 11R. The first curved surface 11R1 and the second curved surface 11R2 are formed to have the same curvature. The first curved surface 11R1 and the second curved surface 11R2 are designed to have a larger curvature than the third curved surface 11R3.

Figure 4:
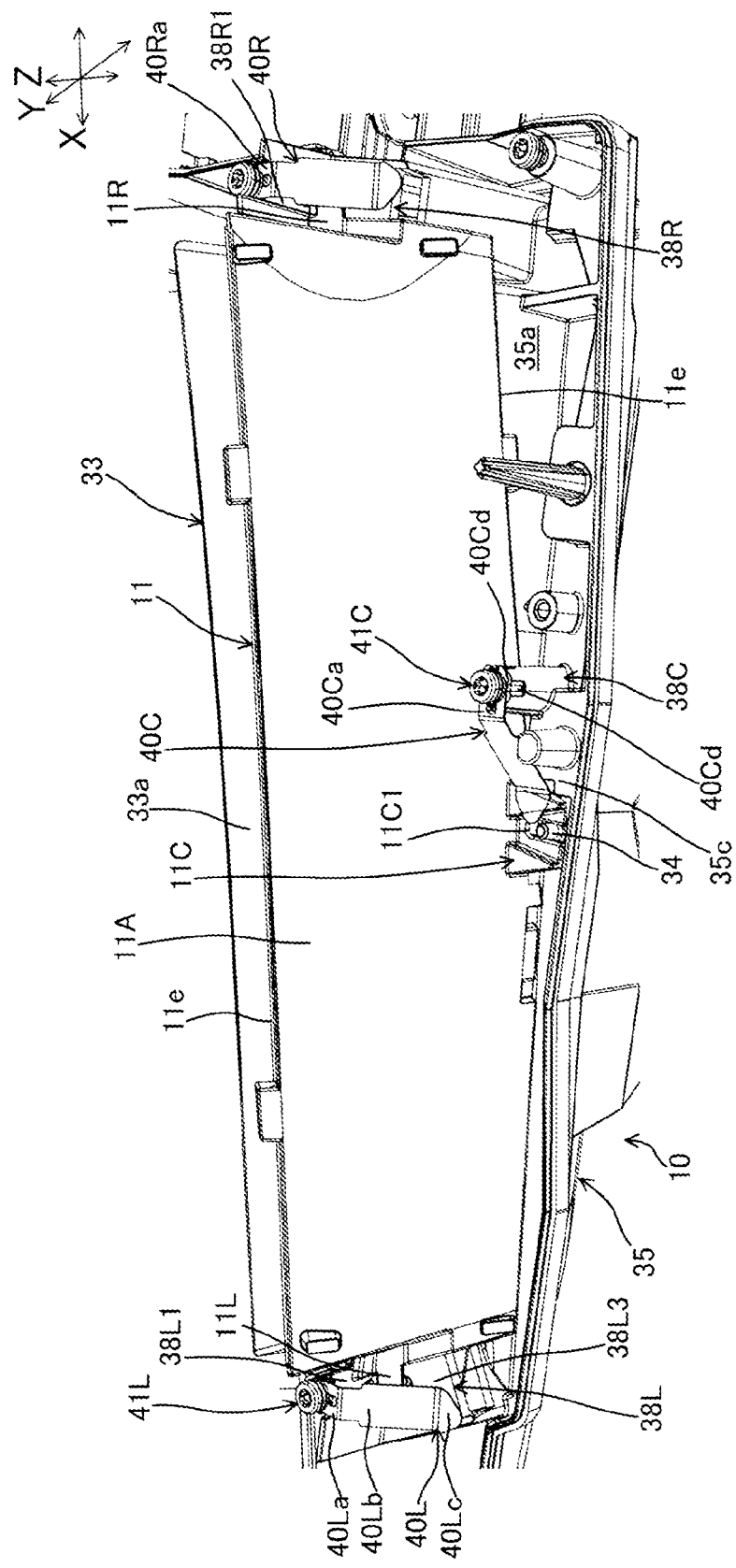
FIG. 4 is a perspective view of the head-up display device according to an embodiment of the present disclosure in the state where the upper cover is removed.

As illustrated in FIG. 4, the positioning unit 11C is a part for positioning the first mirror 11 in the X direction in the holding space 35a by fitting a later-described positioning pin 34 of the holding case unit 35 into the positioning unit 11C. The positioning unit 11C is positioned at a lower end of the main body unit 11A and at a central part in the X direction. The positioning unit 11C is positioned on the back surface side of the reflection surface 11e and is in surface contact with the inner bottom surface 35c. The positioning unit 11C is formed with a fitting hole 11C1 into which the later-described positioning pin 34 is fitted. An inner surface of the fitting hole 11C1 is positioned so as to sandwich the positioning pin 34 from the X direction. The fitting hole 11C1 is formed as a U-shaped notch that penetrates the positioning unit 11C in a thickness direction and opens toward a rear side in the Y direction.

As illustrated in FIG. 4, the holding case unit 35 includes the positioning pin 34. As illustrated in FIG. 3, the mirror support unit 33 includes a frame unit 33a, a pair of side wall units 33b, the shaft support units 38L and 38R, and a spring fixing unit 38C.

The frame unit 33a has a frame shape facing the outer periphery of the reflection surface 11e of the first mirror 11. The frame unit 33a is provided so as to be inclined with respect to the Y direction and the Z direction. The frame unit 33a functions as a parting member that hides an edge portion of the reflection surface 11e. Thus, deterioration of the display quality of the virtual image due to glare at the edge portion of the reflection surface 11e is suppressed.

The pair of side wall units 33b are positioned at both ends of the frame unit 33a in the X direction and extend in a direction orthogonal to the frame unit 33a. The pair of side wall units 33b each have an isosceles triangular plate shape and face the pair of side wall units 11D of the first mirror 11 from the outside in the X direction. The hypotenuses of the side wall units 33b are coupled to edge units of the frame unit 33a extending in the Z direction. A bottom side of the side wall unit 33b is coupled to the inner bottom surface 35c of the holding space 35a of the holding case unit 35.

As illustrated in FIG. 3, the shaft support units 38L and 38R support the shaft units 11L and 11R (see FIG. 2) to position the first mirror 11 in the Z direction and the Y direction in the holding space 35a. The shaft support units 38L and 38R are arranged so as to sandwich the pair of side wall units 33b from the X direction.

As illustrated in FIG. 6, the shaft support unit 38R includes a spring fixing unit 38R1 and the shaft support surface 38R3.

The spring fixing unit 38R1 has a columnar shape extending in the Z direction. A later-described fixed end unit 40Ra of the plate spring 40R is installed on an upper end surface of the spring fixing unit 38R1. A screw hole 38R2 is formed on the upper end surface of the spring fixing unit 38R1. A shaft unit of the screw 41R is screwed into the screw hole 38R2. The screw 41R fixes the later-described fixed end unit 40Ra of the plate spring 40R to the upper end surface of the spring fixing unit 38R1.

Figure 8:
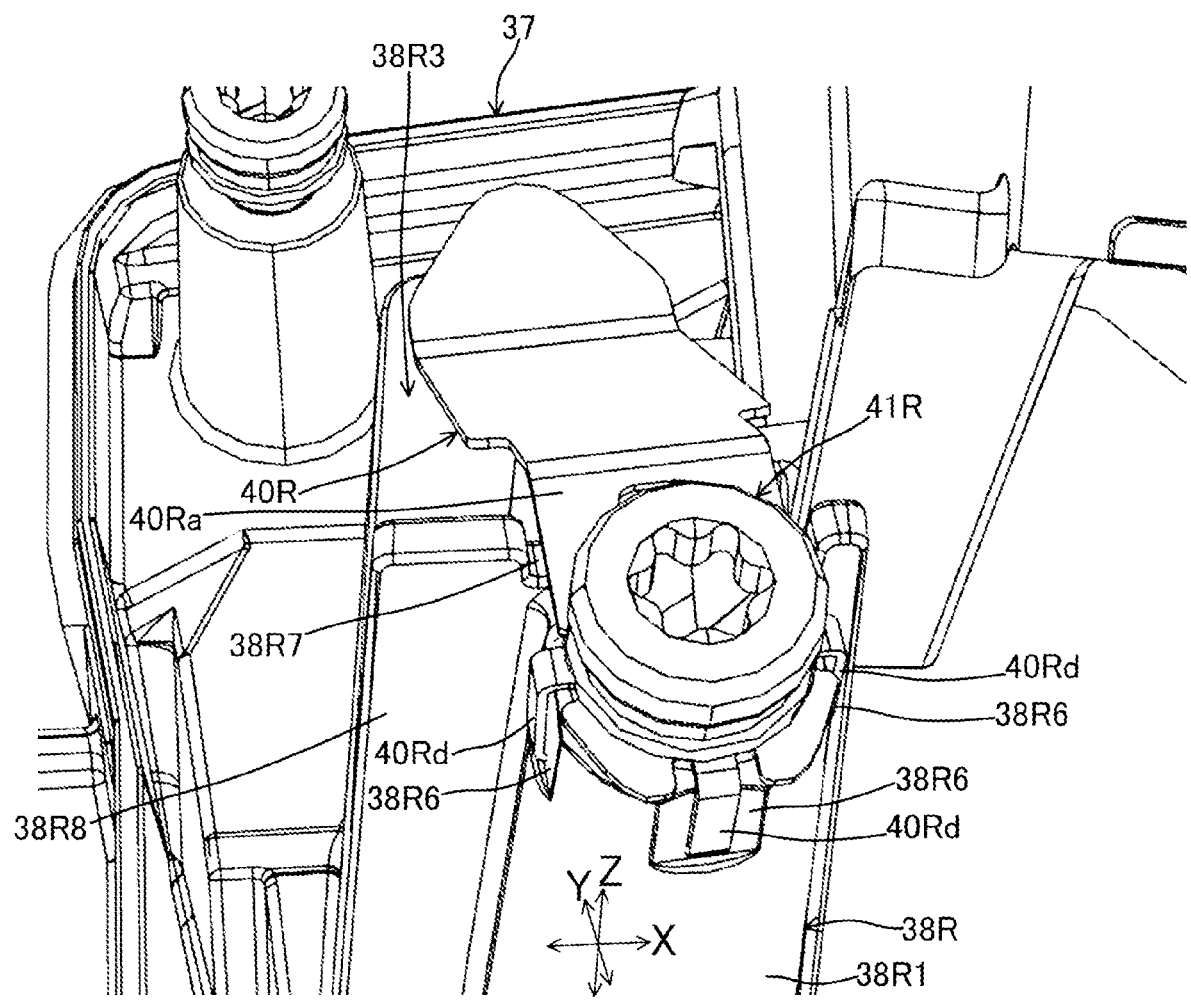
FIG. 8 is a partially enlarged perspective view of the head-up display device according to an embodiment of the present disclosure in the state where the upper cover is removed.

As illustrated in FIG. 8, a plurality of claw contact surfaces 38R6 contacted by tip ends of claw units 40Rd, are formed on the outer peripheral surface of the spring fixing unit 38R1. The plurality of (in this example, three) claw contact surfaces 38R6 are arranged on the outer periphery of the spring fixing unit 38R1 at intervals of 90 degrees.

The claw contact surfaces 38R6 have a curved surface shape in which the outer peripheral surface of the spring fixing unit 38R1 is recessed. This prevents the tip ends of the claw units 40Rd from detaching from the claw contact surfaces 38R6.

As illustrated in FIG. 6, the shaft support surface 38R3 contacts the outer peripheral surface of the shaft unit 11R at two points. The shaft support surface 38R3 includes the first surface 38R4 and the second surface 38R5 that are orthogonal to each other. The first surface 38R4 has a planar shape along the X direction and the Y direction, and is in point contact with the first curved surface 11R1 of the shaft unit 11R. The second surface 38R5 has a planar shape along the X direction and the Z direction, and is in point contact with the second curved surface 11R2 of the shaft unit 11R. The second surface 38R5 is formed on the outer peripheral surface of the spring fixing unit 38R1.

As illustrated in FIG. 8, the shaft support unit 38R includes a spring rotation restriction concave unit 38R7.

The spring rotation restriction concave unit 38R7 is formed at an upper end of a plate-shaped unit 38RB that is orthogonal to the Y direction and positioned between the spring fixing unit 38R1 and the shaft support surface 38R3. The fixed end unit 40Ra of the plate spring 40R is fitted into the spring rotation restriction concave unit 38R7. Contact between the fixed end unit 40Ra of the plate spring 40R and both side surfaces of the spring rotation restriction concave unit 38R7 prevents the plate spring 40R from rotating.

Although the shaft support unit 38R is described above, the shaft support unit 38L includes, similarly to the shaft support unit 38R, a spring fixing unit 38L1 and a shaft support surface 38L3, as illustrated in FIG. 4. A fixed end unit 40La of the plate spring 40L is installed on an upper end surface of the spring fixing unit 38L1. A screw hole into which a shaft unit of the screw 41L is screwed is formed on the upper end surface of the spring fixing unit 38L1.

As illustrated in FIG. 4, the spring fixing unit 38C is provided on the inner bottom surface 35c of the holding space 35a. The spring fixing unit 38C is positioned in a central part of the mirror support unit 33 in the X direction, and on the back surface side of the mirror support unit 33 in the Y direction. The spring fixing unit 38C has a columnar shape extending in the Z direction. A later-described fixed end unit 40Ca of the plate spring 40C is installed on an upper end surface of the spring fixing unit 38C. A screw hole (not illustrated) is formed on the upper end surface of the spring fixing unit 38C. A shaft unit of the screw 41C is screwed into the screw hole.

As illustrated in FIG. 4, the plate spring 40R presses the shaft unit 11R of the first mirror 11 toward the shaft support unit 38R. The plate spring 40L presses the shaft unit 11L of the first mirror 11 toward the shaft support unit 38L. The plate spring 40C presses the positioning unit 11C of the first mirror 11 toward the inner bottom surface 35c of the holding space 35a. Thus, the first mirror 11 is stably supported by the mirror support unit 33 at three points.

As illustrated in FIGS. 5 and 6, the plate spring 40R includes the fixed end unit 40Ra, the shaft contact unit 40Rb, a free end unit 40Rc, and the plurality of claw units 40Rd. The fixed end unit 40Ra is formed in a plate shape installed on the upper end surface of the spring fixing unit 38R1. The fixed end unit 40Ra is formed with a hole 40Rh (see FIG. 6) through which the shaft unit of the screw 41R can pass. The fixed end unit 40Ra is sandwiched between a head unit of the screw 41R and the upper end surface of the spring fixing unit 38R1. Thus, the fixed end unit 40Ra of the plate spring 40R is fixed to the upper end surface of the spring fixing unit 38R1.

As illustrated in FIG. 8, the plurality of claw units 40Rd are arranged on the outer periphery of the fixed end unit 40Ra and are hooked to the outer peripheral surface of the spring fixing unit 38R1. When the plurality of claw units 40Rd are hooked to the outer peripheral surface of the spring fixing unit 38R1, it is possible to temporarily fix the fixed end unit 40Ra of the plate spring 40R to the spring fixing unit 38R1. In the present example, the three claw units 40Rd are arranged at intervals of 90 degrees along the outer periphery of the spring fixing unit 38R1. The claw units 40Rd each have a rectangular plate shape that is elongated in the Z direction. The claw units 40Rd are formed so as to be elastically deformable along the radial direction of the fixed end unit 40Ra. The tip ends of the claw units 40Rd are formed by being bent toward the claw contact surfaces 38R6 of the spring fixing unit 38R1. The tip ends of each of the claw units 40Rd contact the claw contact surfaces 38R6 of the spring fixing unit 38R1.

As illustrated in FIGS. 5 and 6, the shaft contact unit 40Rb is inclined so as to approach the first surface 38R4 of the shaft support surface 38R3 with increasing distance from the fixed end unit 40Ra. The shaft contact unit 40Rb sandwiches the shaft unit 11R between the shaft contact unit 40Rb and the shaft support surface 38R3 and presses the shaft unit 11R toward the shaft support surface 38R3. The shaft contact unit 40Rb is in point contact with the third curved surface 11R3 of the shaft unit 11R.

The free end unit 40Rc is positioned at an end of the shaft contact unit 40Rb opposite to the fixed end unit 40Ra, among the two ends of the shaft contact unit 40Rb. The free end unit 40Rc is positioned below the fixed end unit 40Ra and extends in a direction along the fixed end unit 40Ra. As illustrated in FIG. 6, the free end unit 40Rc is pressed downward by the pressing unit 36b of the upper cover 36. Thus, the shaft contact unit 40Rb is pressed toward the shaft unit 11R with the fixed end unit 40Ra as a fulcrum. Further, the pressing unit 36b suppresses the deformation of the plate spring 40R. The plate springs 40L and 40C have a configuration similar to the plate spring 40R. As illustrated in FIG. 4, the plate spring 40L includes the fixed end unit 40La fixed to the spring fixing unit 38L1 by the screw 41L, a shaft contact unit 40Lb pressing the shaft unit 11L toward the shaft support surface 38L3, a free end unit 40Lc pressed downward by the pressing unit of the upper cover 36, and a plurality of claw units hooked to the spring fixing unit 38L1.

As illustrated in FIG. 4, the plate spring 40C is provided in an orientation orthogonal to the plate springs 40L and 40R, in other words, in an orientation along a back surface of the main body unit 11A of the first mirror 11. Therefore, in the head-up display device 10, it is possible to suppress an increase in the size of the back surface side of the first mirror 11.

As illustrated in FIG. 7, the plate spring 40C includes the fixed end unit 40Ca, an intermediate unit 40Cb corresponding to the shaft contact units 40Lb and 40Rb, the free end unit 40Cc, and a plurality of claw units 40Cd. The fixed end unit 40Ca of the plate spring 40C is fixed by the screw 41C to the upper end surface of the spring fixing unit 38C. In a state where the fixed end unit 40Ca is installed on the upper end surface of the spring fixing unit 38C, the plurality of claw units 40Cd are hooked to the outer peripheral surface of the tip end of the spring fixing unit 38C. The free end unit 40Cc is positioned on the upper surface of the positioning unit 11C and presses the positioning unit 11C toward the inner bottom surface 35c of the holding space 35a of the holding case unit 35.

Next, a procedure for mounting the first mirror 11 in the mirror support unit 33 will be described. The mounting work is performed by a worker or a work robot.

First, as illustrated in FIG. 2, the shaft units 11L and 11R of the first mirror 11 are installed in the shaft support units 38L and 38R, respectively. At this time, as illustrated in FIG. 4, the positioning pin 34 is fitted into the fitting hole 11C1 of the positioning unit 11C. Thus, the first mirror 11 is positioned in the holding space 35a of the holding case unit 35.

Next, the claw units 40Rd and 40Cd of each of the plate springs 40L, 40R, and 40C are sequentially hooked to the tip ends of the spring fixing units 38L1, 38R1, and 38C. Thus, the fixed end units 40La, 40Ra, and 40Ca of the plate springs 40L, 40R, and 40C are temporarily fixed to the spring fixing units 38L1, 38R1, and 38C. In this state, the shaft units 11L and 11R are temporarily fixed to the shaft support units 38L and 38R by the plate springs 40L and 40R, and the positioning unit 11C is temporarily fixed to the inner bottom surface 35c of the holding space 35a by the plate spring 40C.

Temporarily fixing the shaft support units 38L and 38R and the positioning unit 11C makes it possible to prevent the first mirror 11 from being fixed in an inclined state in the holding space 35a of the holding case unit 35.

As illustrated in FIGS. 3 and 4, the plate springs 40L, 40R, and 40C are temporarily fixed to the spring fixing units 38L1, 38R1, and 38C, and then, the fixed end units 40La, 40Ra, and 40Ca of the plate springs 40L, 40R, and 40C are fixed to tip end surfaces of the spring fixing units 38L1, 38R1, and 38C by the screws 41L, 41R, and 41C. Thus, the first mirror 11 is fixed in the holding space 35a of the holding case unit 35.

Thereby, the mounting of the first mirror 11 in the mirror support unit 33 is completed.

Effects

According to the embodiment described above, the following effects are achieved.

(1) The head-up display device 10 includes the display 14 that emits display light 16, the first mirror 11 which is an example of a fixed mirror that reflects the display light 16 from the display 14, the second mirror 12 which is an example of a rotating mirror provided rotatably about the rotation axis Ax and reflecting the display light 16 reflected by the first mirror 11 toward the windshield 19 which is an example of a projection-receiving member, the mirror support unit 33 that fixedly supports the first mirror 11, the holding case unit 35 that holds the second mirror 12 and is formed integrally with the mirror support unit 33, and the plate springs 40L, 40R, and 40C which are examples of a spring for fixing the first mirror 11 to the mirror support unit 33 by pressing the first mirror 11 toward the mirror support unit 33.

According to this configuration, the first mirror 11 is directly supported by the mirror support unit 33 formed as an integral body with the holding case unit 35. Therefore, there are no other members mounted between the first mirror 11 and the holding case unit 35. Thus, it is possible to prevent an error in the attachment position of the first mirror 11 with respect to the holding case unit 35. This prevents a decrease in the display quality of the virtual image. Moreover, it is possible to reduce the number of components in the head-up display device 10.

Further, the mirror support unit 33 is positioned in a direction in which the reflection surface 11e of the first mirror 11 faces. Therefore, it is not necessary to provide a mirror support unit on the back surface side of the first mirror 11 which is the opposite side of the reflection surface 11e. Thus, it is possible to choose a more compact configuration for the head-up display device 10.

(2) The first mirror 11 includes the shaft unit 11R positioned at the end of the first mirror 11 in a longitudinal direction (X direction) and extending along the X direction. The mirror support unit 33 includes the shaft support unit 38R that supports the side surface of the shaft unit 11R. The plate spring 40R, which is an example of a shaft-use spring, is provided so as to contact the side surface of the shaft unit 11R and press the shaft unit 11R toward the shaft support unit 38R.

According to this configuration, the shaft unit 11R is pressed by the plate spring 40R, and thus, a distortion of the reflection surface 11e of the first mirror 11 is suppressed. Therefore, a decrease in the display quality of the virtual image is prevented.

(3) The head-up display device 10 includes the upper cover 36 attached to the holding case unit 35. The upper cover 36 includes the pressing unit 36b that sandwiches the plate spring 40R between the pressing unit 36b and the shaft unit 11R and presses the plate spring 40R toward the shaft unit 11R.

According to this configuration, the plate spring 40R is pressed by the pressing unit 36b and the shaft unit 11R is fixed to the shaft support unit 38R, only by attaching the upper cover 36 to the holding case unit 35.

(4) The first mirror 11 includes the positioning unit 11C provided on the rear surface of the reflection surface 11e of the first mirror 11 and positioned facing the inner bottom surface 35c of the holding case unit 35. The plate spring 40C, which is an example of a positioning spring, is provided so as to contact an upper surface of the positioning unit 11C, which is opposite to a surface of the positioning unit 11C corresponding to the inner bottom surface 35c, and press the positioning unit 11C toward the inner bottom surface 35c of the holding case unit 35.

According to this configuration, the positioning unit 11C is provided on the rear surface side of the first mirror 11, and thus the positioning unit 11C does not obstruct the optical path of the display light 16.

(5) The holding case unit 35 includes the spring fixing units 38L1, 38R1, and 38C each having a columnar shape. The plate springs 40L, 40R, and 40C include the plurality of claw units 40Rd and 40Cd arranged so as to surround the periphery of the tip ends of the spring fixing units 38L1, 38R1, and 38C so as to be hooked to the tip ends of the spring fixing units 38L1, 38R1, and 38C.

According to this configuration, the plate springs 40L, 40R, and 40C can be easily temporarily fixed to the tip ends of the spring fixing units 38L1, 38R1, and 38C. Thus, it is possible to prevent the first mirror 11 from being fixed in an inclined state in the holding space 35a of the holding case unit 35.

(6) The shaft support unit 38R includes the spring rotation restriction concave unit 38R7 into which the fixed end unit 40Ra of the plate spring 40R is fitted.

According to this configuration, contact between the fixed end unit 40Ra of the plate spring 40R and both side surfaces of the spring rotation restriction concave unit 38R7 prevents the plate spring 40R from rotating about the screw 41R.

It is noted that the present disclosure is not limited in any way to the above embodiments and drawings. Modifications (including omission of constituent elements) may be appropriately added as long as the gist of the present disclosure is not changed. An example of the modifications will be described below.

Modification

Figure 9:
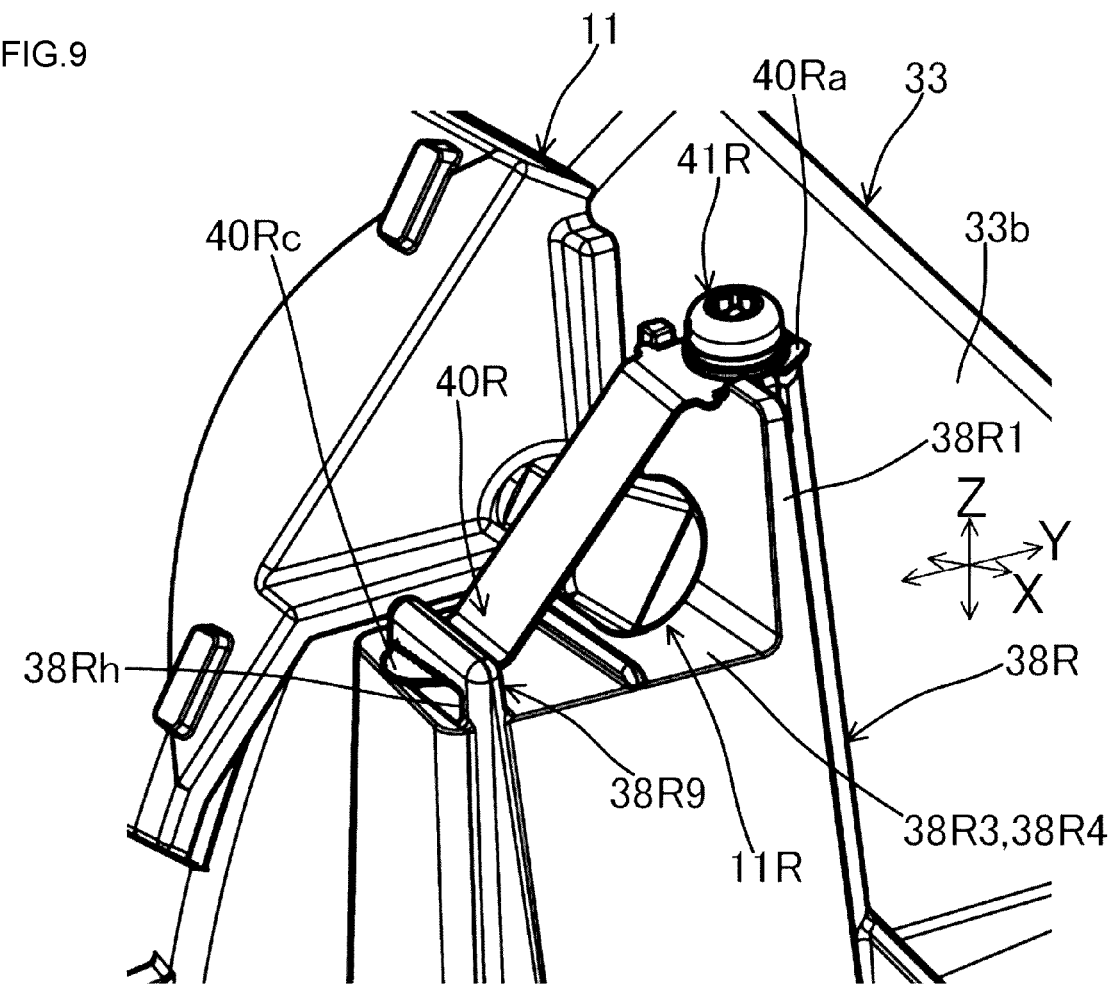
FIG. 9 is a partially enlarged perspective view of the head-up display device according to a modification of the present disclosure in the state where the upper cover is removed.
Figure 10:
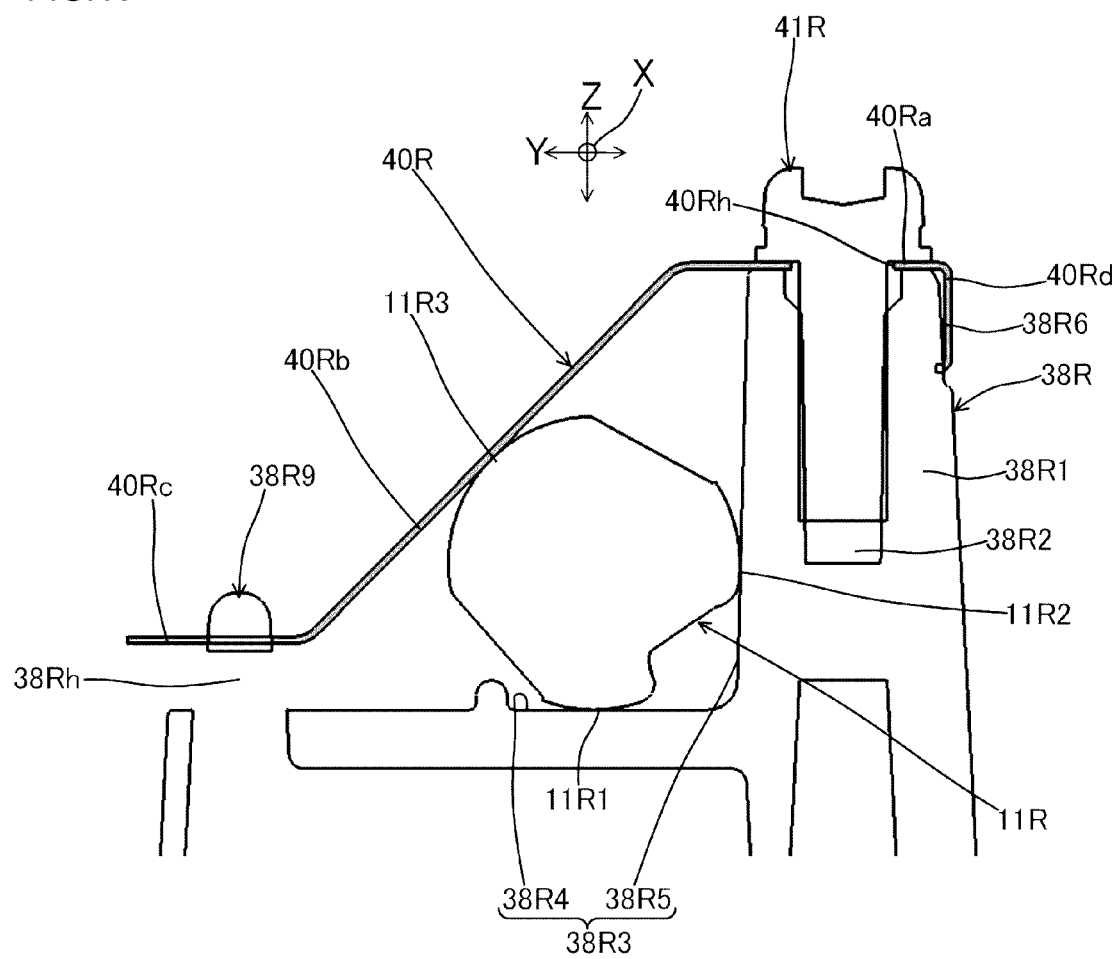
FIG. 10 is a cross-sectional view of a shaft unit, a shaft support unit, a plate spring, and the like according to the modification of the present disclosure.

In the embodiment described above, the upper cover 36 includes the pressing unit 36b that presses the plate spring 40R toward the shaft unit 11R, but the pressing unit may be provided in the shaft support unit 38R, instead of being provided in the upper cover 36. In the present modification, for example, as illustrated in FIGS. 9 and 10, the shaft support unit 38R includes the spring fixing unit 38R1 to which the fixed end unit 40Ra of the plate spring 40R, which is an example of a shaft-use spring, is fixed, and a pressing unit 38R9 that presses the free end unit 40Rc of the plate spring 40R so that the plate spring 40R is pressed toward the shaft unit 11R.

The pressing unit 38R9 is formed on the first surface 38R4 of the shaft support surface 38R3. The pressing unit 38R9 includes an insertion hole unit 38Rh into which the free end unit 40Rc of the plate spring 40R can be inserted. The insertion hole unit 38Rh includes a hole penetrating in the Y direction. The free end unit 40Rc of the plate spring 40R contacts an upper surface in the insertion hole unit 38Rh. Thus, the pressing unit 38R9 presses the free end unit 40Rc of the plate spring 40R from above.

Next, a method of mounting the plate spring 40R to the shaft support unit 38R will be described.

The shaft unit 11R of the first mirror 11 is installed on the shaft support surface 38R3 of the shaft support unit 38R, and then, the free end unit 40Rc of the plate spring 40R is inserted into the insertion hole unit 38Rh of the pressing unit 38R9, while the claw unit 40Rd of the plate spring 40R is hooked to the tip end of the spring fixing unit 38R1. Then, the fixed end unit 40Ra of the spring 40R is fixed to the spring fixing unit 38R1 by the screw 41R.

For example, if a plurality of components are involved in holding the plate spring 40R, size tolerances of the plurality of components accumulate, and the holding force by which the plate spring 40R holds the shaft unit 11R varies easily. On the other hand, according to the present modification, the pressing unit 38R9 is provided in the shaft support unit 38R, and thus, the plate spring 40R can be stably held only by the shaft support unit 38R, which is one component. Therefore, the holding force by which the plate spring 40R holds the shaft unit 11R is unlikely to vary. Further, before the upper cover 36 is attached to the holding case unit 35, the free end unit 40Rc of the plate spring 40R is held by the pressing unit 38R9, and thus the free end unit 40Rc of the plate spring 40R is prevented from obstructing the assembly of the head-up display device 10.

The shaft support unit 38L may include, similarly to the shaft support unit 38R of the present modification, a pressing unit that presses a free end unit of the plate spring 40L so that the plate spring 40L is pressed toward the shaft unit 11L.

In the embodiment described above, the first mirror 11 and the second mirror 12 are both concave mirrors, but the present disclosure is not limited thereto, and at least any one of the first mirror 11 and the second mirror 12 may be a plane mirror.

In the embodiment described above, the projection-receiving member is the windshield 19, but the projection-receiving member may also be a dedicated combiner. Further, the head-up display device 10 is not limited to be mounted in a vehicle, but may be mounted in other means of transport such as airplanes and ships.

In the embodiment described above, the display 14 is, for example, a TFT type liquid crystal display panel, but the display 14 is not limited thereto, and the display 14 may also have a configuration including a micro electro mechanical system (MEMS) or a digital micro-mirror device (DMD).

In the embodiment described above, the free end units 40Lc and 40Rc of the plate springs 40L and 40R may be omitted. In this case, the pressing unit 36b of the upper cover 36 may be formed so as to press the shaft contact units 40Lb and 40Rb of the plate springs 40L and 40R toward the shaft units 11L and 11R. Further, the pressing unit 36b of the upper cover 36 may be omitted.

Moreover, the opposing unit 36c of the upper cover 36 may push the free end unit 40Cc of the plate spring 40C toward the positioning unit 11C, or may press the intermediate unit 40Cb of the plate spring 40C downward.

In the above embodiment, any one or two of the plate springs 40L, 40R, and 40C may be omitted.

The mirror support unit 33 may support the back surface of the first mirror 11, instead of supporting the shaft units 11L and 11R of the first mirror 11. In this case, a plate spring may press the outer periphery of the reflection surface 11e of the first mirror 11 toward the mirror support unit 33.

In the embodiment described above, the claw units 40Rd and 40Cd of the plate springs 40L, 40R, and 40C may be omitted.

Further, the plate springs 40L, 40R, and 40C may be springs of a type other than plate springs.

DESCRIPTION OF REFERENCE NUMERALS

10 Head-up display device
11 First mirror
11a Main body unit
11C Positioning unit
11D Side wall unit
11C1 Fitting hole
11L, 11R Shaft unit
11R1 First curved surface
11R2 Second curved surface
11R3 Third curved surface
11e Reflection surface
12 Second mirror
13 Light source
14 Display
15 Control board
16 Display light
18 Mirror rotation drive unit
19 Windshield
23 Light transmissive plate unit
30 Case
31 Shielding unit
33 Mirror support unit
33a Frame unit
33b Side wall unit
34 Positioning pin
35 Holding case unit
35a Holding space
35b, 36a Opening unit
35c Inner bottom surface
36 Upper cover
36b Pressing unit
36c Opposing unit
37 Lower cover
37a Holding space
38C, 38L1, 38R1 Spring fixing unit
38L, 38R Shaft support unit
38L3, 38R3 Shaft support surface
38R2 Screw hole
38R4 First surface
38R5 Second surface
38R6 Claw contact surface
38R7 Spring rotation restriction concave unit
38R8 Plate-shaped unit
38R9 Pressing unit
38Rh Insertion hole unit
40C, 40L, 40R Plate spring
40Ca, 40La, 40Ra Fixed end unit
40Cb Intermediate unit
40Cc, 40Lc, 40Rc Free end unit
40Cd, 40Rd Claw unit
40Lb, 40Rb Shaft contact unit
40Rh Hole
41C, 41L, 41R Screw
Ax Rotation axis

The invention claimed is:

1. A head-up display device comprising:
a display that emits display light;
a fixed mirror that reflects the display light from the display;
a rotating mirror that is provided rotatably about a rotation axis and reflects, toward a projection-receiving member, the display light reflected by the fixed mirror;
a mirror support unit that supports the fixed mirror;
a holding case unit that holds the rotating mirror and is formed integrally with the mirror support unit; and
a spring that fixes the fixed mirror to the mirror support unit by pressing the fixed mirror toward the mirror support unit,
wherein the fixed mirror includes a shaft unit positioned at an end of the fixed mirror,
wherein the mirror support unit includes a shaft support unit that supports a side surface of the shaft unit, and
wherein a shaft-use spring among a plurality of the springs is a plate spring and is provided so as to contact the side surface of the shaft unit and press the shaft unit toward the shaft support unit.

2. The head-up display device according to claim 1, further comprising:
an upper cover attached to the holding case unit, wherein the upper cover includes a pressing unit that sandwiches the shaft-use spring between the pressing unit and the shaft unit and presses the shaft-use spring toward the shaft unit.

3. The head-up display device according to claim 1, wherein the shaft support unit includes:
  a spring fixing unit to which a fixed end unit of the shaft-use spring is fixed; and
  a pressing unit that presses a free end unit of the shaft-use spring to press the shaft-use spring toward the shaft unit.

4. A head-up display device, comprising:
  a display that emits display light;
  a fixed mirror that reflects the display light from the display;
  a rotating mirror that is provided rotatably about a rotation axis and reflects, toward a projection-receiving member, the display light reflected by the fixed mirror;
  a mirror support unit that supports the fixed mirror;
  a holding case unit that holds the rotating mirror and is formed integrally with the mirror support unit; and
  a spring that fixes the fixed mirror to the mirror support unit by pressing the fixed mirror toward the mirror support unit,
  wherein the fixed mirror includes a positioning unit provided on a rear surface of a reflection surface of the fixed mirror and positioned facing an inner bottom surface of the holding case unit, and
  wherein a positioning spring among a plurality of the springs is a plate spring and is provided so as to contact a surface of the positioning unit opposite to a surface corresponding to the inner bottom surface and press the positioning unit toward the inner bottom surface of the holding case unit.

* * * * *